Jan. 18, 1949.  J. H. ENGLAND  2,459,153
WELDING SYSTEM
Filed May 28, 1945  2 Sheets-Sheet 1
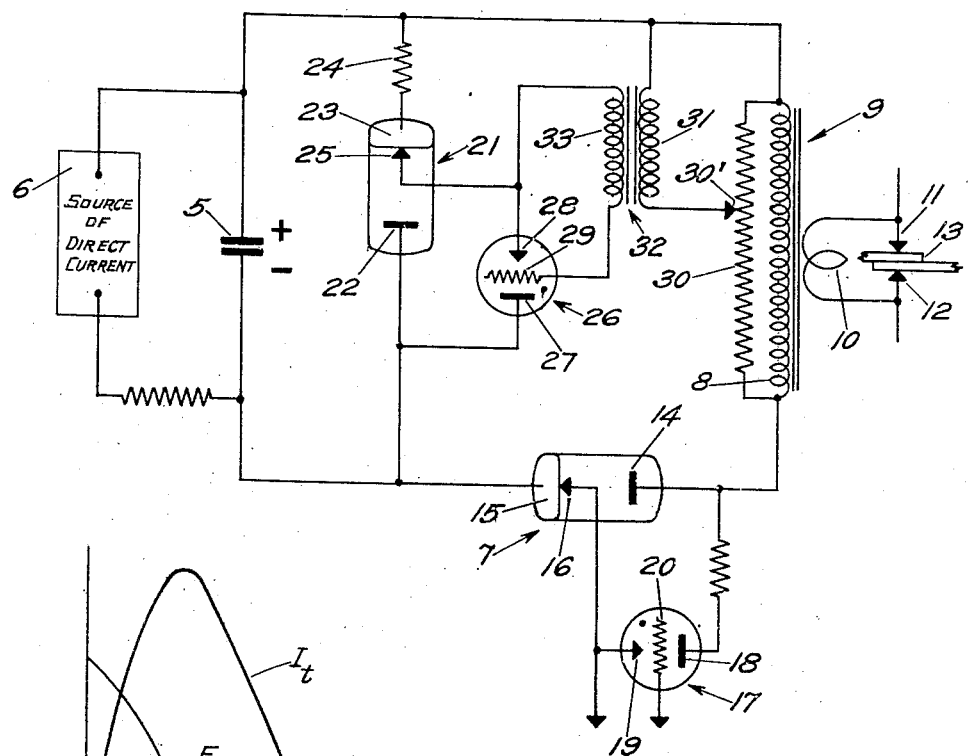
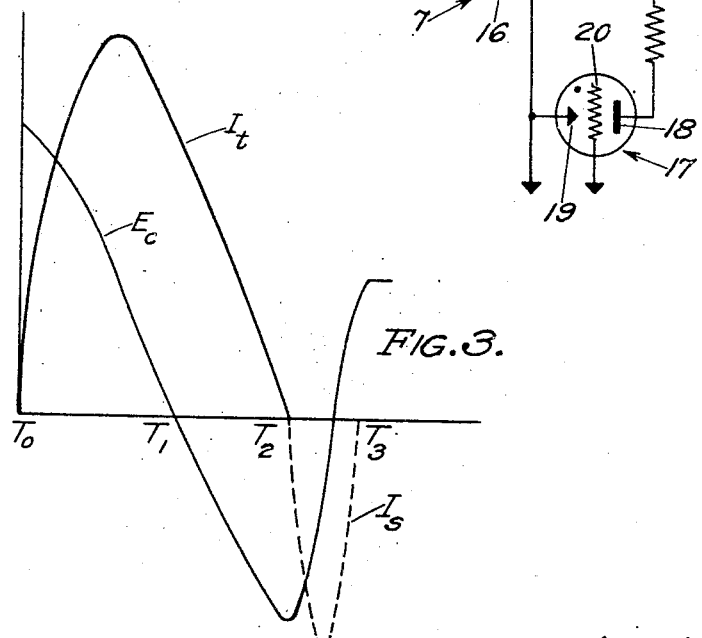
INVENTOR.
JOHN H. ENGLAND,
BY Elmer J. Gorn
ATTY.

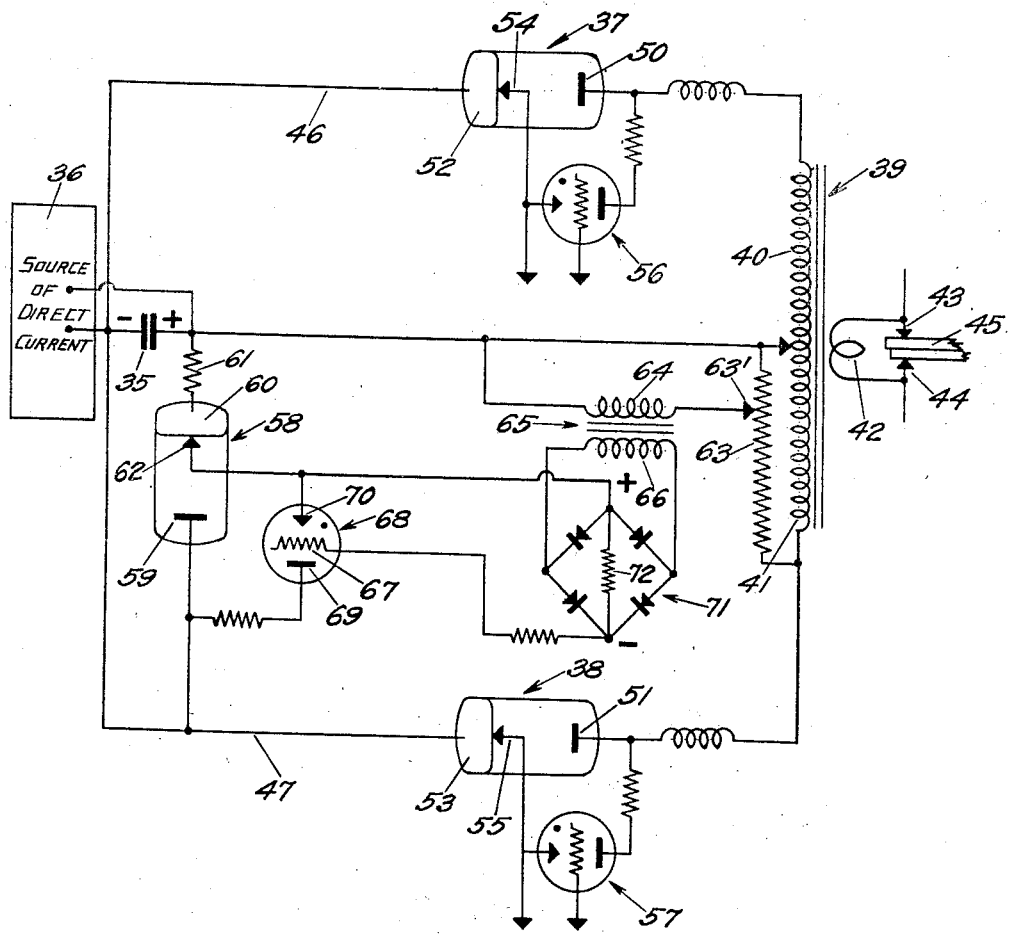

Patented Jan. 18, 1949

2,459,153

UNITED STATES PATENT OFFICE 2,459,153

WELDING SYSTEM

John H. England, Wellesley Hills, Mass., assignor to Raytheon Manufacturing Company, Newton, Mass., a corporation of Delaware Application May 28, 1945, Serial No. 596,119

7 Claims. (Cl. 219—4)

This invention relates to welding systems of the type in which electrical energy is stored in a condenser for subsequent discharge through a resistance welding load.

In welding systems of the type to which the invention relates, a considerable amount of energy is stored in the load circuit, including the welding transformer, by the discharge of the condenser therethrough. As the charge on the condenser drops to zero this energy tends to maintain the current through the system in the same direction as before and thereby tends to recharge the condenser in a polarity inverse to that of the original charge. In order to prevent the waste of this energy, it has heretofore been proposed to provide valve controlled circuits through which the connections between the condenser and the welding load are reversed upon the discharge of the condenser so that the energy remaining in the system is fed back to the condenser in the proper polarity. One example of such a system is shown in the copending application of Hans Klemperer, Serial No. 591,256, filed May 1, 1945.

It is among the objects of the present invention to provide a system for performing the above function in a more simple manner, which will require fewer tubes, and which will permit the use of simple transformers, and otherwise simplify the system.

It is a further object of the invention to provide a system of the type described which is applicable to systems in which the welding impulse is always in the same direction through the welding transformer and equally applicable to systems in which the welding impulse through the welding transformer is alternately reversed for alternate welds in order to reverse the flux in the welding transformer.

The above and other objects and features of the invention will be made fully apparent to those skilled in the art from a consideration of the following detailed description, taken in conjunction with the accompanying drawings in which:

Fig. 1 is a circuit diagram of a welding system constructed in accordance with the principles of the present invention;

Fig. 2 is a circuit diagram of a modified form of the invention; and

Fig. 3 is a set of curves representing the mode of operation of my invention.

Referring to the drawings, reference numeral 5 indicates a storage condenser adapted to be charged from a source of direct current 6. The condenser 5 is adapted to be discharged through a circuit containing a gaseous discharge tube 7 and the primary winding 8 of a welding transformer 9 having a secondary winding 10. The opposite ends of the secondary winding 10 are connected to welding electrodes 11 and 12 adapted to engage the work 13.

The discharge valve 7 may be any suitable discharge device capable of carrying the welding current and adapted to be controlled to initiate a discharge of the condenser 5 through the welding transformer 9. In the instance shown, the discharge device 7 is an ignitron having an anode 14 connected to the positive side of the condenser 5 through the primary winding 8 of the transformer 9 and a pool type cathode 15 connected to the negative side of the condenser 5. A resistance-immersion type igniter 16 for initiating the discharge of the tube 7 is adapted to be energized through a circuit including a discharge tube 17. The tube 17 is provided with an anode 18 connected through a suitable current-limiting resistor to the anode side of the tube 7, and a permanently energized cathode 19 connected to the resistance-immersion igniter 16. The tube 17 is also provided with a control grid 20 which may be energized in a known manner to control the initiation of the discharge of tube 17 and thereby control the timing of an energizing impulse to the igniter 16, and thus control the timing of the discharge of the condenser 5 through the welding transformer 8 and the control tube 7.

In the operation of the parts so far described, assuming that the condenser 5 is normally charged, a high potential difference is impressed across the tubes 7 and 17 in the direction in which these tubes are conducting. The control grid 20 of the tube 17 is normally supplied with a biasing potential blocking conduction through this tube. On removing the blocking potential, which may be effected in a known manner upon the closure of the electrodes 11 and 12 on the work 13 or upon the application of welding pressure thereto, the tube 17 becomes conductive, an exciting impulse is supplied to the resistance-immersion igniter 16, and the tube 7 becomes conductive. The condenser 5 is thereupon discharged through the primary 8 of the transformer 9. As may be seen from the curves in Fig. 3, at a time $T_1$, the charge on the condenser 5 indicated by the curve $E_c$ falls to zero. At this time the current through the transformer $I_t$ has passed its maximum. Energy stored in the load circuit is now fed back to the condenser 5 to charge the same in an inverse direction. It will be noted that since the energy stored in the load circuit is fed back to the condenser, rather than permitted to decay substantially exponentially through a shunt circuit across the primary winding of the transformer 9, the current wave $I_t$ approximates a sine wave of one-half cycle duration. As the current $I_t$ falls to zero, at the time $T_2$, the inverse charge on the condenser reaches a maximum value which while less than the value of the original charge on the condenser is nevertheless substantial. The tube 7 prevents a reversal of the flow of current through the primary winding 8 of the transformer 9 and accordingly, at the time $T_2$, an inverse charge is trapped upon the condenser 5. In order to avoid the waste of energy represented by the inverse charge on the condenser 5 and to reverse this charge so that the condenser 5 will be partially recharged in the proper polarity, I proceed as follows:

An ignitron 21 is connected across the condenser 5 having its anode 22 connected to the normally negative side of the condenser 5 at a point between this condenser and the cathode 15 of the tube 7, and its mercury pool type cathode 23 connected through a reactor 24 to the positive side of the condenser 5. The ignitron 21 is also provided with a resistance-immersion type igniter 25. In order to supply igniting impulses to the resistance-immersion igniter 25, this igniter is connected to the anode 22 through a gaseous discharge device 26 having its anode 27 connected to the anode side of the tube 21 and its cathode 28 connected to the igniter 25. The tube 26 is also provided with a control grid 29 for controlling the discharge thereof and thereby controlling the time of the initiation of the discharge of the tube 21.

In order to energize the control grid 29, I provide a bridging resistor 30 across the primary winding 8 of the transformer 9 having an adjustable tap 30'. The primary winding 31 of a transformer 32 has one end connected to the tap 30' and its opposite end connected to the normally positive side of condenser 5. The secondary winding 33 of the transformer 32 has one end thereof connected to the grid 29 and the other end thereof connected to the cathode 28 of the tube 26.

When the condenser 5 is charged in its normal polarity, the potential applied across the tube 21 is in the direction in which this tube is nonconductive. At the time $T_1$, when the charge upon the condenser 5 tends to reverse, the current $I_t$ which flows through the resistor 30 is high and in such a direction that the current induced in the secondary winding 33 of the transformer 32 applies a negative potential to the control grid 29 blocking the conduction of the tube 26 until the time $T_2$, when the current $I_t$ drops to zero. At this time $T_2$, the condenser 5 has received its maximum charge in the inverse direction, the current through the primary winding 31 of the transformer 32 falls to zero, and accordingly, no blocking potential is applied to the control grid 29 of the tube 26. The tube 26 is fired supplying an energizing impulse to the igniter 25 of the tube 21. The tube 21 becomes conductive, the inverse charge on the condenser 5 is discharged through this tube into reactor 24, and the condenser is thus recharged in the proper polarity. At a time $T_3$, when the current $I_s$ approaches zero the charge $E_c$ upon the condenser 5 is trapped in its normal polarity, and the condenser may be thereafter charged to its full capacity from the source of direct current 6.

In the construction just described, the invention is illustrated as applied to a simple welding circuit utilizing a two terminal welding transformer 9. Fig. 2 illustrates the application of the invention to a somewhat more complex welding circuit of the type in which it is desired to reverse the direction of current to the welding transformer for successive welds to the end that the flux of the transformer will be reversed. Referring to this figure, a condenser 35 is adapted to be charged from a source of direct current 36 and alternately discharged by way of the ignitrons 37 and 38 through the primary winding of the transformer 39. To this end the primary winding of the transformer 39 is divided into two halves 40 and 41 by a center tap connected directly to the normally positive side of the condenser 35. The secondary winding 42 of the transformer 39 is connected, as in the previously described form, to electrodes 43 and 44 adapted to engage the work 45. The normally negative side of the condenser 35 is connected through branch lines 46 and 47 to the opposite ends of the primary winding of the transformer 39 by way of ignitrons 37 and 38, respectively. The ignitrons include anodes 50 and 51, respectively, connected to the outer ends of the primary winding of the transformer 39, and mercury pool type cathodes 52 and 53 connected to the leads 46 and 47, respectively. The ignitrons 37 and 38 are also provided with immersion-resistance type igniters 54 and 55, respectively, to which controlled energizing impulses may be supplied through gaseous discharge tubes 56 and 57 in a manner which will be fully apparent from the description of the energization of the igniter 16 of the tube 7 in the form previously described.

In the operation of this form of the invention, the condenser 35 is first discharged through one of the halves, for example 40, of the primary winding of the transformer 39 to effect one welding operation, and for the next succeeding welding operation the condenser 35, having been recharged to the proper polarity, is discharged through the other half 41 of the primary winding of the transformer 39. It will be understood that when the ignitron 37 is fired to permit the discharge of the condenser 35 through the upper half 40 of the primary winding, the other ignitron 38 is prevented from firing due to the blocking potential applied to the control grid of the tube 57. Similarly when the ignitron 38 fires to permit a discharge to the condenser 35 through the lower half 41 of the primary winding, the ignitron 37 is prevented from firing due to the blocking potential applied to the control grid of the tube 56.

Whichever path the discharge follows, the curves shown in Fig. 3 still apply, and at the time $T_2$ an inverse charge will be trapped upon the condenser 35. In order to reverse the inverse charge upon the condenser so that the same will be partially charged in the proper polarity, I provide an ignitron 58 having an anode 59 connected to one of the branch lines 46 or 47, in this instance 47, at a point between the normally negative side of the condenser 35 and the cathode 53 of the ignitron 38. The ignitron 58 is also provided with a mercury pool type cathode 60 connected to the normally positive side of the condenser 35 by way of a reactor 61. The ignitron 58 is also provided with an immersion-resistance type igniter 62. In order to supply energizing impulses to the igniter 62 at the instant $T_2$ at which it is desired to reverse the inverse charge on the condenser 35, I proceed as follows:

A bridging resistor 63 having an adjustable tap

63' is provided across one of the halves, in this instance 41, of the primary winding of transformer 39. The primary winding 64 of a transformer 65 is connected at one end to the tap 63' and at the other end to the normally positive side of condenser 35. The secondary winding 66 of the transformer 65 is connected to the neutral terminals of a bridge type rectifier 71, the negative terminal of which is connected through a suitable current-limiting resistance to the control grid 67 of a gaseous discharge device 68. The anode 69 of the discharge device 68 is connected to the anode circuit of the ignitron 58, and the cathode 70 of said discharge tube is connected to the positive terminal of the rectifier 71 and to the igniter 62 of the ignitron 58.

In operation, regardless of whether the original discharge of the condenser 35 is through the upper half of the transformer 39 or the lower half thereof, current proportionate to $I_t$ in either case will flow through the bridging resistor 63. In the case that the discharge is through the lower half 41, a portion of the discharge current flows directly through the resistor 63. In the case that the discharge is through the upper half 40, a current is induced in the lower half 41, which induced current flows through resistor 63. Current flows through the primary winding 64 of the transformer 65 in either case, and the resulting current in the secondary winding 66 is applied by the rectifier 71 in a direction to supply a blocking potential to control grid 67 of the tube 68. When the current $I_t$ drops to zero, at the time $T_2$, a blocking potential is no longer applied to the control grid 67. Accordingly, the tube 68 is fired and an igniting impulse is supplied to the igniter 62 of the ignitron 58. The ignitron 58 fires to discharge the condenser 35 so that the inverse charge thereon is reversed, and the condenser partially recharged in the proper polarity. Preferably a resistor 72 of high value, for example 100,000 ohms, is connected across the positive and negative terminals of the rectifier 71 to permit a small current flow therethrough whenever a potential is applied thereacross. This is desirable to preserve the rectifying elements of the bridge when these are copper oxide cells.

From the foregoing it will be seen that either form of the invention provides a construction in which the discharge of the condenser to the welding load is in the form of one-half of an approximately sine wave, and that, at the time $T_2$, the current through the welding load has fallen to zero so that the movable electrode may be removed from the work without the danger of drawing a spark which would burn a small hole through the protective coating of the electrode.

While there have been herein described certain preferred embodiments of the invention, other embodiments within the scope of the appended claims will be apparent to those skilled in the art from a consideration of the embodiments shown and teachings hereof.

What is claimed is:

1. A welding system comprising a condenser, a welding load circuit, means for discharging said condenser through said welding load circuit in a unidirectional pulse of current during which said condenser is charged in an inverse direction, a shunt circuit across said condenser, and means responsive to the termination of said pulse of current for closing said shunt circuit to reverse the polarity of the inverse charge on said condenser thereby partially recharging the same in the original polarity.

2. A welding system comprising a condenser, a welding load circuit, means for discharging said condenser through said welding load circuit in a unidirectional pulse of current during which said condenser is charged in an inverse direction, a shunt circuit across said condenser, a normally blocked discharge device controlling said shunt circuit, and means responsive to the termination of said pulse of current for unblocking said discharge device to reverse the polarity of the inverse charge on said condenser thereby partially recharging the same in the original polarity.

3. A welding system comprising a condenser, a welding load circuit, means including a controlled discharge device for discharging said condenser through said welding load circuit in a unidirectional pulse of current during which said condenser is charged in an inverse direction, a shunt circuit across said condenser by-passing said controlled discharge device, and means responsive to the termination of said pulse of current for closing said shunt circuit to reverse the polarity of the inverse charge on said condenser thereby partially recharging the same in the original polarity.

4. A welding system comprising a condenser, a welding transformer, means including a controlled discharge device for discharging said condenser through said welding transformer in a unidirectional pulse of current during which said condenser is charged in an inverse direction, a shunt circuit across said condenser by-passing said transformer and said controlled discharge device, a normally blocked discharge device controlling said shunt circuit, and means responsive to the termination of said pulse of current for unblocking said discharge device to reverse the polarity of the inverse charge on said condenser thereby partially recharging the same in the original polarity.

5. A welding system comprising a condenser, a welding transformer, said transformer having a center tap on its primary winding to divide the same into two portions, means for discharging said condenser alternatively through either one of said winding portions in a unidirectional pulse of current during which said condenser is charged in an inverse direction, a shunt circuit across said condenser by-passing both of said winding portions, a normally blocked discharge device in said shunt circuit, and means responsive to the termination of a pulse of current through either of said winding portions for closing said shunt circuit by unblocking said discharge device to reverse the polarity of the inverse charge on said condenser thereby partially recharging the same in the original polarity.

6. A welding system comprising a condenser, a welding transformer, said transformer having a center tap on its primary winding to divide the same into two portions, a pair of controlled-ignition discharge devices, one of said discharge devices being connected between one side of said condenser and one end of said primary winding and the other of said discharge devices being connected between the same side of said condenser and the other end of said primary winding, the opposite side of said condenser being connected to said center tap, means for firing each of said discharge devices whereby said condenser may be discharged alternatively through either one of said winding portions in a unidirectional pulse of current during which said condenser is charged in an inverse direction, a shunt circuit across said condenser by-passing both of said controlled-ignition discharge devices, and means responsive to the termination of a pulse of current through either of said winding portions for closing said shunt circuit to reverse the polarity of the inverse charge on said condenser thereby partially recharging the same in the original polarity.

7. A welding system comprising a condenser, a welding transformer, said transformer having a center tap on its primary winding to divide the same into two portions, a pair of controlled-ignition discharge devices, one of said discharge devices being connected between one side of said condenser and one end of said primary winding and the other of said discharge devices being connected between the same side of said condenser and the other end of said primary winding, the opposite side of said condenser being connected to said center tap, means for firing each of said discharge devices whereby said condenser may be discharged alternatively through either one of said winding portions in a unidirectional pulse of current during which said condenser is charged in an inverse direction, a shunt circuit across said condenser by-passing both of said controlled-ignition discharge devices, a normally blocked discharge device in said shunt circuit, and means responsive to the termination of a pulse of current through either of said winding portions for unblocking said discharge device to reverse the polarity of the inverse charge on said condenser thereby partially recharging the same in the original polarity.

JOHN H. ENGLAND.

REFERENCES CITED

The following references are of record in the file of this patent:

UNITED STATES PATENTS

| Number | Name | Date |
| --- | --- | --- |
| 2,179,105 | Sidney | Nov. 7, 1939 |
| 2,294,671 | Livingston | Sept. 1, 1942 |